(12) United States Patent
Tanimoto et al.

(10) Patent No.: US 7,848,497 B2
(45) Date of Patent: Dec. 7, 2010

(54) COMMUNICATION DEVICE AND COMMUNICATION METHOD

(75) Inventors: Yoshifumi Tanimoto, Hirakata (JP); Yasushi Yamazaki, Nagaokakyo (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 1133 days.

(21) Appl. No.: 11/500,440

(22) Filed: Aug. 8, 2006

(65) Prior Publication Data

US 2007/0041530 A1   Feb. 22, 2007

(30) Foreign Application Priority Data

Aug. 19, 2005   (JP) .............................. 2005-238598

(51) Int. Cl.
*H04M 11/00*   (2006.01)
(52) U.S. Cl. ............................. 379/93.24; 379/100.01
(58) Field of Classification Search ............ 379/100.01, 379/93.24; 358/402, 439, 440
See application file for complete search history.

(56) References Cited

FOREIGN PATENT DOCUMENTS

| JP | 4-157972 A | 5/1992 |
|---|---|---|
| JP | 5-183716 A | 7/1993 |
| JP | 7-15611 A | 1/1995 |
| JP | 2000-307839 A | 11/2000 |
| JP | 2002-135513 A | 5/2002 |
| JP | 2003-32411 A | 1/2003 |
| JP | 2003-46702 A | 2/2003 |

OTHER PUBLICATIONS

Japanese Office Action dated Oct. 15, 2008, issued in corresponding Japanese Paten Application No. 2005-238598.

*Primary Examiner*—Stella L Woo
(74) *Attorney, Agent, or Firm*—Westerman, Hattori, Daniels & Adrian, LLP

(57) ABSTRACT

A communication device and a communication method capable of transmitting data after confirming a destination device in one SMTP communication. A transmitter communication device carries out a communication request to a recipient communication device and SMTP communication is started. The recipient communication device transmits information of a recipient stored in a storage unit to the transmitter communication device under a prescribed procedure. Before receiving the data, the recipient communication device suspends the communication protocol with a communication channel maintained. The transmitter communication device displays the received information of the recipient on a display unit, and suspends the communication protocol with the communication channel maintained. Accordingly, a user can confirm a transmission destination from the display. After confirming the transmission destination, the user instructs to transmit the data. Accordingly, the communication protocol is continued and the data can be transmitted.

4 Claims, 6 Drawing Sheets

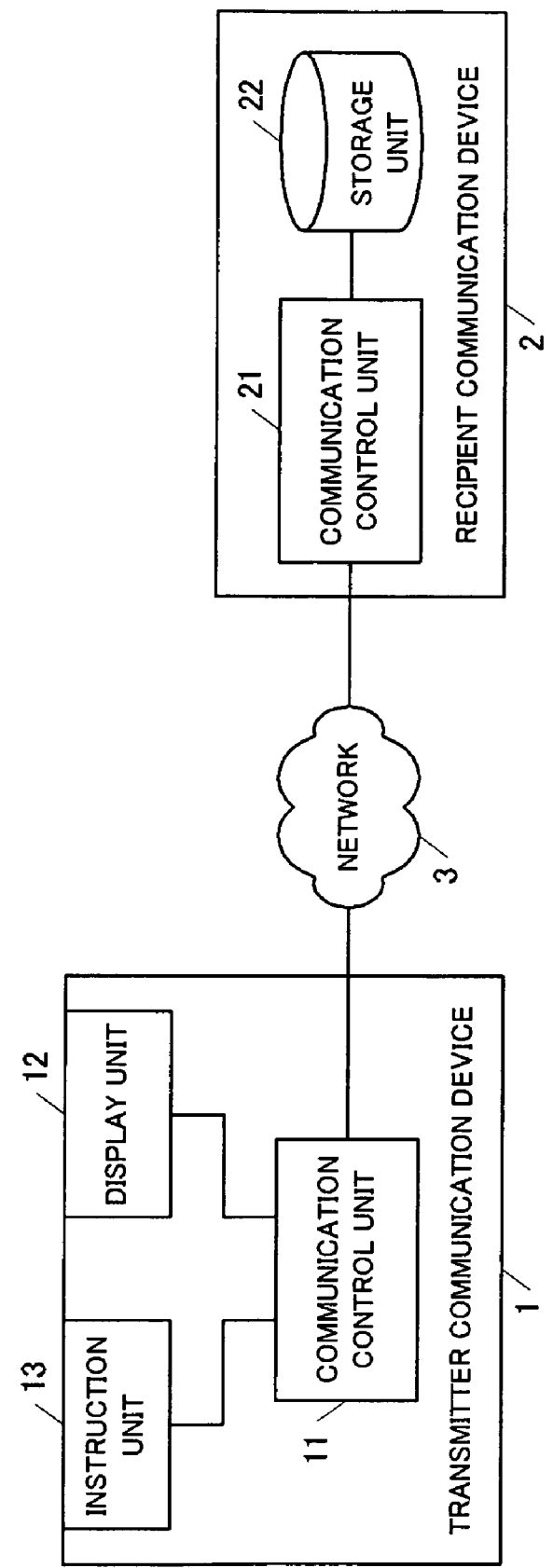

FIG. 2

(A) 
```
PLEASE ENTER TRANSMISSION NO.
TO : 1002
[FAX]  [HISTORY]  [GROUP]
```

PRESS [START]
(SCAN ORIGINAL
DOCUMENT, ETC.)

(B)
```
STORE CODE : 1002
SHINJUKU BRANCH
[OK]  [CANCEL]
```
← DISPLAY OF INFORMATION OF RECIPIENT

PRESS [OK] | PRESS [CANCEL] → SUSPEND TRANSMISSION (C)
```
COMMUNICATION OK
DURING E-MAIL TRANSMISSION
[FAX]  [HISTORY]  [GROUP]
```

(D)
```
COMMUNICATION OK
E-MAIL TRANSMISSION COMPLETED
[FAX]  [HISTORY]  [GROUP]
```

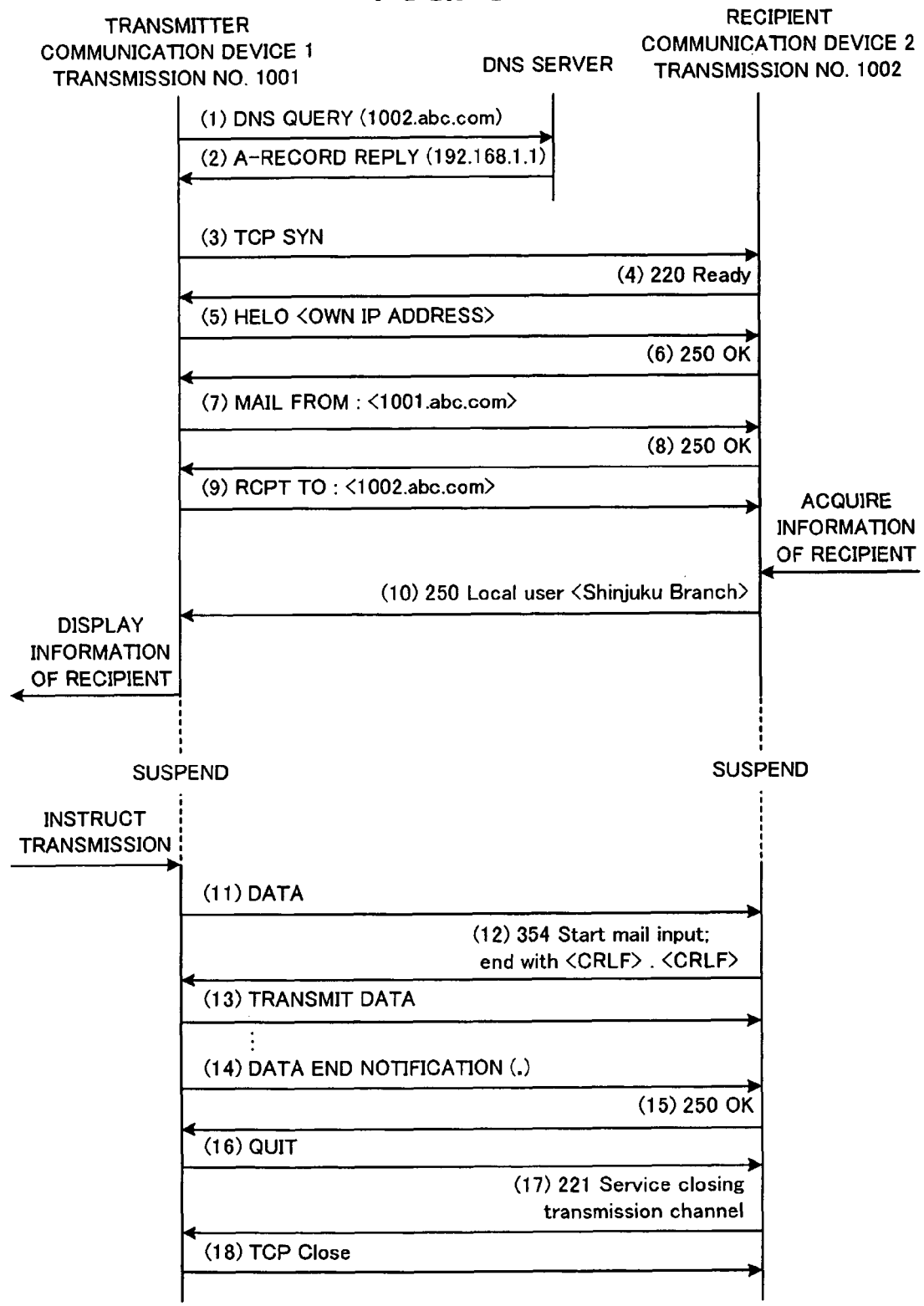

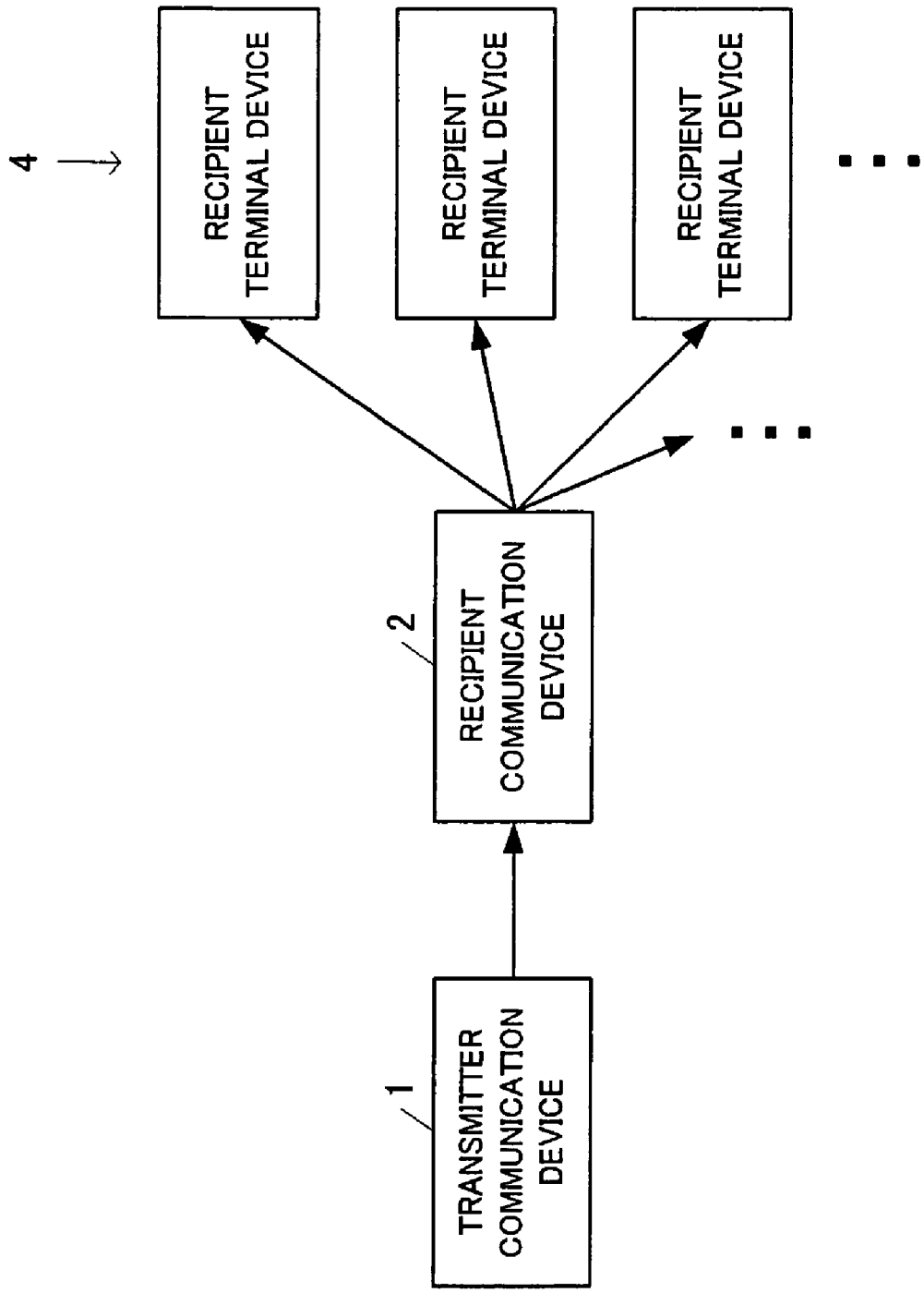

FIG. 5

(A) PLEASE ENTER TRANSMISSION NO.
TO : 5010
[FAX] [HISTORY] [GROUP]

↓ PRESS [START]
(SCAN ORIGINAL DOCUMENT, ETC.)

(B) STORE CODE : 5010
TOKYO BRANCH (REPRESENTATIVE)
[OK] [CANCEL]  ← DISPLAY OF INFORMATION OF RECIPIENT

PRESS [OK] ↓     PRESS [CANCEL] → SUSPEND TRANSMISSION (C) COMMUNICATION OK
DURING E-MAIL TRANSMISSION
[FAX] [HISTORY] [GROUP]

↓

(D) COMMUNICATION OK
E-MAIL TRANSMISSION COMPLETED
[FAX] [HISTORY] [GROUP]

COMMUNICATION DEVICE AND
COMMUNICATION METHOD

BACKGROUND OF THE INVENTION

1. Field of the Invention

The present invention relates to communication technology for transferring data through a network by the Simple Mail Transfer Protocol (SMTP).

2. Description of the Related Art

A method for transmitting data such as an image through a network includes an Internet facsimile (T. 37) for transmitting and receiving image data as an attached file of electronic mail (hereinafter "e-mail") and a real-time Internet facsimile (T. 38) using a procedure of G3 FAX used by a telephone line.

When transmitting data, a destination is entered and an instruction is made to start the transmission. There is a demand that a user wishes to confirm whether or not a destination to which the data is actually transmitted is a correct destination. For example, in the case of the G3 FAX, a name corresponding to a telephone number transmitted from a recipient is acquired from a telephone directory of a transmitter and the acquired name is displayed. Alternatively, a name or the like is transmitted from the recipient to the transmitter using a unique procedure (Nonstandard Facilities (NSF) and Nonstandard Facilities Setup (NSS)), and the name or the like is displayed at the transmitter. However, even when information of a communication destination is displayed, a communication protocol proceeds. Thus, even when the displayed communication destination is incorrect, the communication proceeds and the data is transmitted.

In the case of the real-time Internet facsimile, the G3 FAX procedure is used directly. Therefore, in the same manner as the G3 FAX, even when the name or the like of the recipient to be a transmission destination is displayed, the communication protocol proceeds. Thus, it is not possible to carry out the transmission after confirming whether or not the transmission destination is correct.

In the case of the Internet facsimile which carries out transmission and reception using e-mail, normally, information of a destination cannot be acquired. The SMTP and the Post Office Protocol (POP) are used for the transmission and the reception of the e-mail. The e-mail is basically accumulated in an e-mail server by the SMTP. Depending on circumstances, the e-mail is transferred to another e-mail server and a destination device retrieves the e-mail from the recipient by the POP. Therefore, in case of the e-mail, communication cannot be carried out in real-time. Prior to the transmission of the data from the transmitter, information cannot be transmitted from the recipient to the transmitter. Therefore, prior to the transmission of the data, the transmitter cannot display the information of the transmission destination for confirmation. The transmitter can just transmit the data regardless of the status of the transmission destination. Even when the transmission destination cannot retrieve the e-mail, the transmitter cannot learn of such a fact.

For example, according to a conventional art, each of commands transmitted and received by a facsimile procedure is respectively transmitted and received as one e-mail, and the facsimile procedure is proceeded by exchanging e-mails. Accordingly, ability can be exchanged between one another, and information of the transmission destination can be acquired. Thus, the transmission destination can be confirmed. However, since each of procedures is carried out by exchanging e-mails, an extremely long period of time is required. In addition, since a large number of e-mails are exchanged, an order of the e-mails is required to be monitored and the e-mails are required to be distinguished from other e-mails received in other communication protocols.

SUMMARY OF THE INVENTION

In order to overcome the problems described above, an advantage of the present invention is to provide a communication device and a communication method capable of transmitting data after confirming a destination in one SMTP communication.

A preferred aspect of the present invention relates to a communication device and a communication method in which communication is carried out with another communication device by the SMTP. A recipient communication device previously holds information of a recipient. When receiving a communication request from a transmitter communication device, the recipient communication device starts the SMTP communication. Under a prescribed procedure, the recipient communication device transmits the held information of the recipient to the transmitter communication device. Before receiving data, the recipient communication device suspends a communication protocol with a communication channel maintained and waits to transfer the data. Further, the recipient communication device may include a function of receiving data in place of one or a plurality of recipient terminal devices and transferring the received data to one or a plurality of the recipient terminal devices.

After a transmitter communication device starts the SMTP communication to the recipient communication device, a display unit of the transmitter communication device displays the information of the recipient received from the recipient communication device. The transmitter communication device suspends the communication protocol with the communication channel maintained. Then, the transmitter communication device continues the subsequent communication protocol including the transmission of the data. During the suspension of the communication protocol, the transmitter communication device waits for an instruction from a user as to whether or not to transmit the data. When receiving an instruction from the user to transmit the data, the transmitter communication device may continue the subsequent communication protocol including the transmission of the data. When a transmission destination is not an intended transmission destination, the transmission may be canceled.

According to the above-described preferred aspect of the present invention, in the SMTP communication protocol, the recipient communication device transmits the information of the recipient to the transmitter communication device, and the transmitter communication device displays on the display unit the information of the recipient received from the recipient communication device. Before the transmission and the reception of the data, the communication protocol is suspended. Therefore, the user of the transmitter communication device can confirm the transmission destination prior to the transmission of the data. Furthermore, by carrying out the transmission instruction when the transmission destination is correct, the subsequent communication protocol including the transmission of the data can be continued. As described above, in one SMTP communication, the user can confirm the transmission destination and then transmit the data. Since the information of the recipient is transmitted from the transmission destination, the data can be transmitted after confirming that the transmission destination is active.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1 is a block diagram illustrating a preferred embodiment of the present invention.

FIG. 2 illustrates an example of a transition of displayed contents displayed on a display unit of a transmitter communication device in a first operation example according to a preferred embodiment of the present invention.

FIG. 3 is a sequence diagram illustrating an example of a communication protocol carried out between a transmitter communication device and a recipient communication device in the first operation example according to a preferred embodiment of the present invention.

FIG. 4 schematically illustrates a communication mode carried out in a second operation example according to a preferred embodiment of the present invention.

FIG. 5 illustrates another example of a transition of displayed contents displayed on the display unit of the transmitter communication device in the second operation example according to a preferred embodiment of the present invention.

DETAILED DESCRIPTION OF PREFERRED EMBODIMENTS

Figure 6:
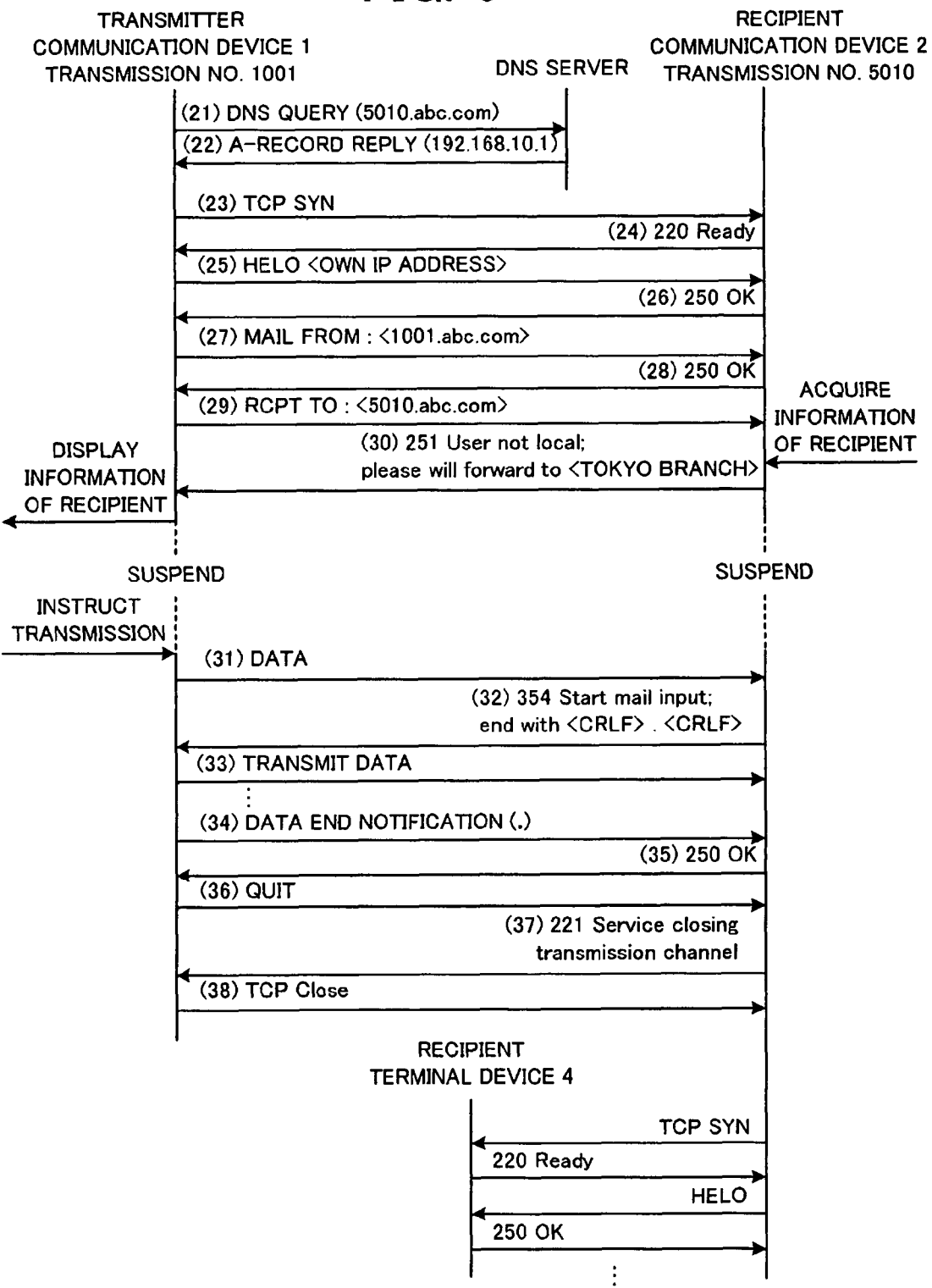
FIG. 6 is a sequence diagram illustrating another example of the communication protocol carried out between the transmitter communication device and the recipient communication device in the second operation example according to a preferred embodiment of the present invention.

FIG. 1 is a block diagram illustrating a preferred embodiment of the present invention. In the drawings, the reference numeral 1 denotes a transmitter communication device, the reference numeral 2 denotes a recipient communication device, the reference numeral 3 denotes a network, the reference numeral 11 denotes a communication control unit, the reference numeral 12 denotes a display unit, the reference numeral 13 denotes an instruction unit, the reference numeral 21 denotes a communication control unit, and the reference numeral 22 denotes a storage unit. In the example illustrated in FIG. 1, the transmitter communication device 1 and the recipient communication device 2 are connected via the network 3 such that communication can be carried out. Various other network devices may be connected to the network 3. The network 3 is capable of carrying out communication by the SMTP. For example, the network 3 is a Local Area Network (LAN) or the Internet. In the example illustrated in FIG. 1, for a convenience of the description, the transmitter communication device 1 and the recipient communication device 2 are separate devices. However, each of communication devices may include a function of both the transmitter communication device 1 and the recipient communication device 2.

The transmitter communication device 1 can transmit data to another communication device, for example, the recipient communication device 2, through the network 3 by carrying out the SMTP communication. In this example, the transmitter communication device 1 includes the communication control unit 11, the display unit 12, and the instruction unit 13 or the like.

The communication control unit 11 of the transmitter communication device 1 carries out a communication control by the SMTP. When transmitting data to the recipient communication device 2, the transmitter communication device 1 starts the SMTP communication with the recipient communication device 2 and receives information of a recipient from the recipient communication device 2. Then, the transmitter communication device 1 displays the received information of the recipient on the display unit 12. Subsequently, before transmitting the data, the transmitter communication device 1 suspends a communication protocol of the SMTP with a communication channel (a Transmission Control Protocol (TCP) connection) maintained. During this period, the transmitter communication device 1 waits for a user to make an instruction to the instruction unit 13. When receiving an instruction to transmit the data, the transmitter communication device 1 continues a subsequent communication protocol and transmits the data. When receiving an instruction not to transmit the data, the transmitter communication device 1 ends the communication.

Further, even when the transmitter communication device 1 suspends the communication protocol and waits for an instruction of the user, there may be a case in which the instruction is not made by the user for a long time. To deal with such a case, for example, when an instruction is not made by the user during a prescribed period of time measured by a timer or the like, the communication may be ended, or the data may be transmitted by continuing the subsequent communication protocol. Alternatively, a setting can be made as to execute either one of the operations.

During the suspension of the communication protocol of the SMTP, for example, NOOP may be transmitted or received or an extension command may be transmitted or received to maintain a TCP connection. Alternatively, when a suspension time is previously determined, e.g., when there is a setting to wait for an instruction from the user only for a prescribed period of time, a period of time corresponding to the suspension time may be designated as a timeout time and the transmission communication device 1 and the recipient communication device 2 may be configured to be on standby for such a period of time.

The display unit 12 may be various types of displaying devices. The display unit 12 displays various pieces of information to present the information to the user. In the present preferred embodiment, the display unit 12 displays at least the information of the recipient transmitted from the recipient communication device 2.

The instruction unit 13 may be various types of input devices. The user can carry out an instruction to the transmitter communication device 1 from the instruction unit 13. In the present preferred embodiment, the instruction unit 13 accepts at least an entry regarding a transmission destination and an instruction regarding whether or not to transmit the data after the information of the recipient is displayed on the display unit 12.

The recipient communication device 2 can receive data from another communication device, for example, the transmitter communication device 1, through the network 3 by carrying out the SMTP communication. In the present preferred embodiment, the recipient communication device 2 includes the communication control Knit 21 and the storage unit 22 or the like.

The communication control unit 21 of the recipient communication device 2 carries out a communication control by the SMTP. When receiving a communication request from another communication device, e.g., the transmitter communication device 1, the recipient communication device 2 starts the SMTP communication. Then, under a prescribed procedure, the recipient communication device 2 transmits the information of the recipient stored in the storage unit 22 to the transmitter communication device 1. Before receiving data, the recipient communication device 2 suspends the communication protocol with a communication channel (a TCP connection) maintained and waits for a transfer of the data. During this period, the recipient communication device 2 holds the TCP connection by transmitting or receiving NOOP or by transmitting or receiving an extension command as described above. Alternatively, when a timeout time is designated prior to the suspension, the recipient communication device 2 may suspend the communication protocol for the designated timeout time. Alternatively, the recipient communication device 2 may include a setting of a time longer than the normal timeout of the SMTP.

When the transmitter communication device 1 continues the communication protocol during the suspension, the recipient communication device 2 restarts the subsequent procedure to receive the data transmitted from the transmitter communication device 1. When a communication termination command is transmitted from the transmitter communication device 1 or in case of the timeout, the recipient communication device 2 ends the communication without receiving the data.

The storage unit 22 may store the information of the recipient. As the information of the recipient, the storage unit 22 may store a name or the like to be displayed on the display unit 12 of the transmitter communication device 1. In this case, when the recipient communication device 2 supports a plurality of e-mail addresses, the storage unit 22 may store the information of the recipient, such as the name, for each of the e-mail addresses.

Further, the recipient communication device 2 may include a function of receiving data in place of one or a plurality of recipient terminal devices (not illustrated) and transferring the received data to one or a plurality of the recipient terminal devices.

Next, a description will be made of a specific example of an operation according to a preferred embodiment of the present invention. FIG. 2 illustrates an example of a transition of displayed contents displayed on the display unit 12 of the transmitter communication device 1 in a first operation example according to a preferred embodiment of the present invention. FIG. 3 is a sequence diagram illustrating an example of a communication protocol carried out between the transmitter communication device 1 and the recipient communication device 2. FIG. 3 also illustrates a communication protocol with a Domain Name System (DNS) server (not illustrated).

When transmitting the data from the transmitter communication device 1, first, a transmission destination is required to be designated. In this example, a transmission number is assigned to a transmission destination, and an instruction of the transmission destination can be made by designating the transmission number. Accordingly, the user can designate the transmission destination just by entering a number. In a display example illustrated in FIG. 2(A), "1002" is designated as the transmission destination. The designation of the transmission destination may include other characters and not limited to numbers. Other various methods may be adopted for designating a transmission destination. For example, an address may be entered directly, or a telephone directory function may be used.

When a transmission destination is designated from the instruction unit 13, an instruction to start the processing is carried out by operating a start key or the like. For example, in the same manner as a facsimile, an image on an original document may be scanned by a scanner (not illustrated) or an instructed file may be prepared for transmission.

Based on the designated transmission destination, at (1) of FIG. 3, the communication control unit 11 transmits an address corresponding to the designated transmission destination to a DNS server. At (2), the transmitter communication device 1 receives an Internet Protocol (IP) address corresponding to the transmitted address as an address (A) record or a mail exchange (MX) record reply. In the example illustrated in FIG. 3, the IP address corresponding to the transmission destination "1002" is 192.168.1.1.

When the transmitter communication device 1 learns the IP address of the transmission destination, at (3), the transmitter communication device 1 carries out a TCP connection request to the recipient communication device 2 using the IP address. In response to the TCP connection request, at (4), the recipient communication device 2 transmits an acknowledgement (220 Ready) indicating that a TCP connection has been established. Accordingly, the TCP connection is established, and a series of the SMTP communication can be carried out.

At (5), the transmitter communication device 1 transmits a HELO command to the recipient communication device 2 for starting a transmission procedure of e-mail. At (6), the recipient communication device 2 transmits an acknowledgement (250 OK) of a command completion to the transmitter communication device 1.

Next, at (7), the transmitter communication device 1 transmits a MAIL FROM command indicating an address of the transmitter to the recipient communication device 2. At (8), the recipient communication device 2 transmits an acknowledgement (250 OK) of a command completion to the transmitter communication device 1.

At (9), the transmitter communication device 1 transmits an RCPT TO command indicating a destination to the recipient communication device 2. When receiving the RCPT TO command, the recipient communication device 2 retrieves the Information of the recipient stored in the storage unit 22. The recipient communication device 2 adds the information of the recipient to a response code and returns the response code to the transmitter communication device 1. In this example, at (10), the recipient communication device 2 adds "Local user <Shinjuku Branch>" to the response code 250 and returns the response code to the transmitter communication device 1. After returning the response code, the recipient communication device 2 suspends the communication protocol of the SMTP with the TCP connection maintained and waits for a command from the transmitter communication device 1.

When the transmitter communication device 1 receives the response code transmitted at (10) from the recipient communication device 2, the transmitter communication device 1 acquires the information of the recipient (in this example, "Shinjuku Branch") from the received response code. FIG. 2(B) illustrates this display example. From the display, the user can learn whether or not the designated transmission destination is correct or whether or not the transmission destination is currently operating, for example. Further, when receiving the response code, the transmitter communication device 1 does not proceed immediately onto a next command transmission (transmission of a DATA command). The transmitter communication device 1 suspends the communication protocol of the SMTP with the TCP connection maintained.

When the user refers to the display as illustrated in FIG. 2(B) and confirms the transmission destination, the user operates an "OK" button to instruct a transmission of the data. Alternatively, when the transmission destination is incorrect, the user operates a "CANCEL" button to cancel the transmission.

When the user operates the "OK" button and instructs the data transmission, the transmitter communication device 1 restarts the communication protocol of the SMTP. At (11), the transmitter communication device 1 transmits a DATA command indicating a start of the data transmission to the recipient communication device 2. At the same time, the transmitter communication device 1 changes the display on the display unit 12 to "DURING E-MAIL TRANSMISSION" as illustrated in FIG. 2(C).

The recipient communication device 2, which has been suspending the communication protocol of the SMTP, restarts the communication protocol of the SMTP upon receiving the DATA command from the transmitter communication device 1. At (12), the recipient communication device 2 returns a response code (354) of the DATA command to the transmitter communication device 1.

The transmitter communication device 1 receives a response code from the recipient communication device 2, and at (13), transmits the data. At (14), the transmitter communication device 1 transmits a data end notification at the end of the data. When the recipient communication device 2 receives the data without a problem, at (15), the recipient communication device 2 returns an acknowledgement (250 OK).

After transmitting the data, at (16), the transmitter communication device 1 transmits a QUIT command as a transmission termination process. At (17), the recipient communication device 2 returns a response code (221). At (18), the TCP connection is ended, and a series of the SMTP data transmission/reception process is ended. When the communication ends, the display unit 12 displays a message indicating the end of the communication as illustrated in FIG. 2(D), e.g., a message "E-MAIL TRANSMISSION COMPLETED".

As described above, the transmitter communication device 1 displays the information of the recipient transmitted from the recipient communication device 2 prior to the transmission of the data. Accordingly, the transmitter communication device 1 can transmit the data after the user confirms the transmission destination.

While the information of the recipient illustrated in FIG. 2(B) is being displayed, when the user determines that the data should not be transmitted, e.g., when the transmission destination is incorrect, the user operates the "CANCEL" button to end the communication without transmitting the data. In this case, (11) through (15) are omitted among the communication protocol illustrated in FIG. 3, and the procedure of (16), the QUIT command, and onward is executed. Accordingly, unlike a conventional device, according to the preferred embodiment of the present invention, it is possible to prevent the procedure from being continued and the data from being transmitted when the information of the recipient is displayed. As a result, the communication may be canceled before the transmission of the data.

After the display unit 12 carries out the display as illustrated in FIG. 2(B), there may be a case in which the user does not carry out any instruction. To deal with such a case, when a prescribed period of time elapses after the display, the communication may be terminated in the same manner as when the "CANCEL" button has been operated. Accordingly, improper transmission of data can be prevented. Alternatively, since the "START" button is operated after the transmission destination has been designated in FIG. 2(A), even when a confirmation is not made, the subsequent communication protocol may be restarted and the data may be transmitted as if the "OK" button has been operated. Alternatively, a setting can be made previously as to carry out which operation, and the operation may be carried out in accordance with the setting. Even when carrying out either one of the operations, for example, an alarm may be sounded to urge the user to carry out an instruction.

The recipient communication device 2 can receive data addressed to a plurality of transmission numbers. In this case, an IP address corresponding to the plurality of the transmission numbers is registered with the DNS server, and even when either one of the transmission numbers is designated, a connection is established with the same recipient communication device 2. Alternatively, the recipient communication device 2 may store the information of the recipient corresponding to the plurality of the transmission numbers in the storage unit 22. In this case, based on the destination transmitted at (9) in FIG. 3, the recipient communication device 2 can retrieve the corresponding information of the recipient and transmit the retrieved information to the transmitter communication device 1.

FIG. 4 schematically illustrates a communication mode carried out in a second operation example according to a preferred embodiment of the present invention. FIG. 5 illustrates another example of a transition of displayed contents displayed on the display unit 12 of the transmitter communication device 1 in the second operation example. FIG. 6 is a sequence diagram illustrating another example of the communication protocol carried out between the transmitter communication device 1 and the recipient communication device 2 in the second operation example. In the drawings, reference numeral 4 denotes a recipient terminal device. In the second operation example described hereinafter, the recipient communication device 2 includes a function of receiving data in place of one or a plurality of the receiving terminal devices 4 and distributing the received data to one or a plurality of the receiving terminal devices 4. That is, as illustrated in FIG. 4, the transmitter communication device 1 transmits data to the recipient communication device 2, and the recipient communication device 2 receives the data transmitted from the transmitter communication device 1. Then, the recipient communication device 2 distributes the received data to the recipient terminal device 4. A conventional technology is applicable to the distribution of the data.

In the second operation example, the operation performed until the transmission of the RCPT TO command that designates the e-mail address to be the destination in the communication protocol is the same as in the first operation example. The operation in the second operation example that is the same as the first operation example will be described briefly. A description will be made primarily of the operation that is different from the above-described first operation example.

When transmitting data from the transmitter communication device 1, first, a transmission destination is designated. In this example, although the transmission destination is designated by entering the transmission number, the recipient communication device 2 is designated instead of the recipient terminal device 4 that ultimately receives the data. When the transmission destination is designated, an instruction to start the processing is carried out by operating a start key or the like.

In order to start communication with the recipient communication device 2, at (21) of FIG. 6, the transmitter communication device 1 transmits an address corresponding to the instructed transmission destination to the DNS server. At (22), the transmitter communication device 1 receives an IP address corresponding to the transmitted address as an A record or an MX record reply. In this example, the IP address corresponding to the transmission destination "5010" is 192.168.10.1.

When the transmitter communication device 1 learns the IP address of the transmission destination, at (23), the transmitter communication device 1 carries out a TCP connection request to the recipient communication device 2 using the IP address. At (24), the recipient communication device 2 returns an acknowledgement (220 Ready). Accordingly, a TCP connection is established, and a series of SMTP communication can be carried out.

Next, at (25), the transmitter communication device 1 transmits a HELO command to the recipient communication device 2. At (26), the recipient communication device 2 transmits an acknowledgement (250 OK) of the command completion to the transmitter communication device 1.

At (27), the transmitter communication device 1 transmits a MAIL FROM command indicating an address of the transmitter to the recipient communication device 2. At (28), the recipient communication device 2 transmits an acknowledgement (250 OK) of the command completion to the transmitter communication device 1.

At (29), the transmitter communication device 1 transmits an RCPT TO command indicating a destination to the recipient communication device 2. When receiving the RCPT TO command, the recipient communication device 2 retrieves the information of the recipient stored in the storage unit 22. The recipient communication device 2 adds the information of the recipient to the response code, and returns the response code to the transmitter communication device 1. In the above-described example, 250 is returned as the response code. In this example, at (30), the recipient communication device 2 returns a response code 251 and adds a message "User not local; please will forward to <TOKYO BRANCH>" to the response code. Then, the recipient communication device 2 returns the response code to the transmitter communication device 1. Accordingly, the designated transmission destination functions to receive the data, and the data can be transferred to another recipient terminal device 4. The recipient communication device 2 may indicate to the transmitter communication device 1 that the "TOKYO BRANCH" includes one or a plurality of the recipient terminal devices 4 and the recipient communication device 2.

After returning the response code, the recipient communication device 2 suspends the communication protocol of the SMTP with the TCP connection maintained, and waits for a command from the transmitter communication device 1.

When the transmitter communication device 1 receives a response code indicated in (30) from the recipient communication device 2, the transmitter communication device 1 acquires the information of the recipient (in this example, "TOKYO BRANCH") from the received response code. The transmitter communication device 1 displays the acquired information on the display unit 12. This display example is illustrated in FIG. 5(B). According to this display example, it is possible to learn from the response code and the message that the recipient communication device 2, which is the transmission destination, will transfer the data to other recipient terminal devices 4. In the example illustrated in FIG. 5(B), there is an indication of "REPRESENTATIVE".

Referring to the display, the user can confirm whether or not the designated transmission destination is correct, whether or not the transmission destination is during operation, or that the transmission destination is a representing destination and that the transmission will not be carried out directly. Further, even when receiving the response code, the transmitter communication device 1 does not proceed immediately onto a next command transmission (transmission of the DATA command). The transmitter communication device 1 suspends the communication protocol of the SMTP with the TCP connection maintained.

The user refers to the display as illustrated in FIG. 5(B) and confirms the transmission destination. Then, by operating the "OK" button, the user can instruct the transmission of the data. Alternatively, when the transmission destination is incorrect, the user operates the "CANCEL" button to cancel the transmission.

The subsequent processes are the same as the first operation example. When the user operates the "OK" button and instructs the transmission of the data, the communication protocol of the SMTP is restarted and a procedure of (31) through (38) illustrated in FIG. 6 (which is the same as (11) through (18) of FIG. 3) is executed. In this case, the display unit 12 carries out a display as illustrated in FIG. 5(C) and (D).

Then, the recipient communication device 2 specifies the recipient terminal device 4 to which the received data is to be distributed. Then, the recipient communication device 2 transmits the data to the specified recipient terminal device 4 by the SMTP. A distribution destination of the received data is not limited to one recipient terminal device 4. The received data may be distributed to a plurality of recipient terminal devices 4, not limited to one recipient terminal device 4.

As described above, the transmitter communication device 1 displays the information of the recipient transmitted from the recipient communication device 2 prior to the transmission of the data. The data can be transmitted after the user confirms the transmission destination. The recipient communication device 2 may represent one or a plurality of the recipient terminal devices 4 and return the information of the recipient to the transmitter communication device 1. Then, the recipient communication device 2 may receive the data from the transmitter communication device 1 and distribute the received data to the recipient terminal device 4.

While the information of the recipient is being displayed as illustrated in FIG. 5(B), when the user operates the "CANCEL" button and instructs to terminate the communication, the transmitter communication device 1 executes the procedure of the QUIT command of (36) and onward to terminate the communication without transmitting the data. In this case, since the data is not transmitted to the recipient communication device 2, the data is of course not distributed to the recipient terminal device 4. When the user does not perform any operation, it can be dealt in the same manner as the above-described first operation example.

In the second operation example, the recipient communication device 2 may change a distribution destination. Various distribution modes may be adopted depending on a system of the recipient. For example, the second operation is applicable when the recipient terminal device 4 is located within a local system and cannot be accessed from a remote device, or when the recipient terminal device 4 is preferable to be kept in secrecy from an aspect of safety. Moreover, the recipient terminal device 4 may be changed case-by-case.

When distributing the data, an e-mail address of the transmitter communication device 1 may be used, and the data may be distributed to the recipient terminal device 4 according to the transmitter communication device 1.

When a transmission number for a broadcast communication is set, the transmitter communication device 1 instructs the transmission number for the broadcast communication as the destination and transmits the data to the recipient communication device 2. Accordingly, the recipient communication device 2 can distribute the data to a plurality of recipient terminal devices 4, which are broadcast destinations. In the same manner as in the first operation example, the recipient communication device 2 can receive the data addressed to a plurality of transmission numbers. Therefore, when the broadcast destinations are grouped and a transmission number is assigned to each group, the broadcast destinations can be changed by changing the transmission number designated by the transmitter communication device 1. Various usages are possible by combining such a function supporting a plurality of the transmission numbers and the function for distributing the data to the recipient terminal devices 4.

In the above-described first and the second operation examples, the data is directly transmitted by the SMTP to the target recipient communication device 2. Therefore, a query is carried out to the DNS server using an address in which the transmission number is included in a domain name, and the IP address of the recipient communication device 2 is acquired. Accordingly, in the same manner as general e-mail, the data can be transmitted directly to the recipient communication device 2 without requiring an e-mail server and without using the POP when receiving the data, and the information of the recipient is returned to the transmitter communication device 1 in the communication process. In case of a constitution like the above-described second operation example, an e-mail address in which a user name and a domain name are connected via "@" like a general e-mail address may be used. The recipient communication device 2 may be specified by the domain name, and the recipient terminal device 4 may be specified by the user name. Also in this case, the storage unit 22 of the recipient communication device 2 may store the information of the recipient corresponding to each user name, and return the information of the recipient of the recipient terminal device 4 specified by the user name. Accordingly, the transmitter communication device 1 can transmit the data after confirming the transmission destination.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. A communication device comprising:
   an information holding means for holding a piece of information for each of a plurality of recipients having a corresponding transmission number;
   a communication control means, after starting communication by a simple mail transfer protocol by receiving a communication request from a transmitter communication device, for receiving a RCPT TO command from the transmitter communication device, retrieving from the information holding means the piece of information for a recipient corresponding to a transmission number which the RCPT TO command indicates, transmitting the retrieved piece of information of the recipient to the transmitter communication device, suspending a communication protocol with a communication channel maintained, and receiving data from the transmitter communication device after the communication protocol is restarted.

2. The communication device according to claim 1, wherein the communication control means receives data in place of at least one recipient terminal device and transfers the received data to the at least one recipient terminal device.

3. The communication device according to claim 1, wherein when receiving a specific transmission number, the communication control means transfers the received data to a plurality of specific recipient terminal devices.

4. A communication method comprising the steps of:
   holding a piece of information for each of a plurality of recipients having a corresponding transmission number in an information holding means;
   receiving a RCPT TO command from a transmitter communication device;
   starting communication by a simple mail transfer protocol;
   retrieving from the information holding means the piece of information for a recipient corresponding to a transmission number which the RCPT TO command indicates;
   transmitting the retrieved piece of information of the recipient held in the information holding means to the transmitter communication device; and
   waiting transmission of data from the transmitter communication device by suspending a communication protocol with a communication channel maintained prior to receiving of the data.

* * * * *